United States Patent
Imoto (12)

(10) Patent No.: US 6,275,612 B1
(45) Date of Patent: Aug. 14, 2001

(54) CHARACTER DATA INPUT APPARATUS AND METHOD THEREOF

(75) Inventor: Noriko Imoto, Zama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/092,700

(22) Filed: Jun. 6, 1998

(30) Foreign Application Priority Data

Jun. 9, 1997 (JP) ................................... 9-150962

(51) Int. Cl.[7] .............................. G06K 9/00; G06K 9/64; G09G 5/22
(52) U.S. Cl. ......................... 382/189; 382/278; 345/141
(58) Field of Search ................................... 382/187, 188, 382/189, 186, 185, 278; 345/116, 141

(56) References Cited

U.S. PATENT DOCUMENTS

| | | | |
|---|---|---|---|
| 5,734,749 | * 3/1998 | Yamada et al. | 382/187 |
| 5,757,959 | * 5/1998 | Lopresti | 382/186 |
| 5,812,698 | * 9/1998 | Platt et al. | 382/186 |
| 5,841,901 | * 11/1998 | Arai et al. | 382/187 |
| 5,859,935 | * 1/1999 | Johnson et al. | 382/317 |
| 5,870,492 | * 2/1999 | Shimizu et al. | 382/187 |
| 6,002,799 | * 12/1999 | Sklarew | 382/189 |

FOREIGN PATENT DOCUMENTS

| | | | |
|---|---|---|---|
| 2-266484 | 4/1989 | (JP) | G06K/9/03 |
| 5-314304 | 5/1992 | (JP) | G06K/9/03 |
| 6-036072 | 7/1992 | (JP) | G06K/9/62 |
| 6-202800 | 12/1992 | (JP) | G06F/3/033 |
| 6-215176 | 1/1993 | (JP) | G06K/9/03 |

\* cited by examiner

*Primary Examiner*—Amelia M. Au
*Assistant Examiner*—Mehrdad Dastouri
(74) *Attorney, Agent, or Firm*—Robert P. Tassinari, Jr.

(57) ABSTRACT

When a user points a hot spot 322-i, a selection frame 38 is displayed in correlation to input frames 320-i (hot spot 322-i). The selection frame 38 includes within a same window a list of candidate characters of a handwritten character inputted to the input frame 320-i and a symbol (x,^) indicating editing process such as deletion and insertion with respect to the prime candidate character displayed in the prime candidate frame 34. When the user selects a candidate character within the selection frame 38, the prime candidate character in the prime candidate frame 34 is replaced with a newly selected candidate character. When the user selects a symbol indicating deletion and insertion, etc., an editing process is performed with respect to the character string displayed in the prime candidate frame 34 and the input frame 320-i.

16 Claims, 6 Drawing Sheets

CHARACTER DATA INPUT APPARATUS AND METHOD THEREOF

FIELD OF THE INVENTION

This invention relates to a character data input apparatus and, a method thereof for recognizing a handwritten character to convert it to character data which can easily correct character data recognized or inputted erroneously.

BACKGROUND OF THE INVENTION

In a small information processing apparatus such as a PDA (personal digital assistants) apparatus which does not have a keyboard, a method of obtaining input data is by recognizing a character which a user handwrites using a stylus pen on an input screen displayed in a display device.

As such handwritten character input method, PEPA5-22948 (reference 1) discloses a method of changing a candidate character obtained by recognizing a character handwritten within a predetermined frame to another candidate character by pointing to a predetermined position in the frame.

PUPA 6-195519 (reference 2) discloses a method of correcting an erroneously recognized character by a further handwritten input.

PUPA 6-251201 reference (3) and PUPA 7-93484 (reference 4) disclose a method of correcting an erroneously recognized character by depressing a predetermined selection area of an input frame.

PUPA 6-215176 (reference 5) discloses a method of displaying a plurality of correction methods simultaneously in correcting an erroneously recognized character to allow a character to be selected by using a keyboard.

However, correction of a character is cumbersome in the handwritten character input methods disclosed in the above mentioned references 1, . . . 4 in that a character to be corrected has to be first selected, a selection has to be made to change to another candidate character and an edit process has to be performed, and a further selection has to be made of another candidate character or to an editing method of deletion and insertion.

In the method described in the reference 5, a keyboard has to be used to correct a character which method is not suitably adapted to a small PDA apparatus, etc., many of which are not provided with a keyboard.

Therefore it is an object of this invention to provide a data input apparatus and a method thereof which allows an input of data in the form of a handwritten character to be performed with ease and improved operability and is particularly suitable for a portable PDA apparatus, etc., of a small size and a light weight.

It is a further object of this invention to provide a data input apparatus and a method thereof which allows a character to be corrected with ease and improved operability when an error occurs in the input and the recognition of a handwritten character.

BRIEF DESCRIPTION OF THE INVENTION

To achieve the above objectives, the data input apparatus of this invention comprises; input frame display means for displaying one or more input frames used for input of a handwritten character, handwritten character receiving means for receiving a handwritten character inputted to each of said displayed input frames to display it in said input frame, character recognition means for recognizing each received handwritten character to correlate it with one or more candidates of character (candidate character), selection frame display means for displaying a selection frame containing in a same window said candidate character and a graphic image indicating a predetermined editing process for said candidate character and used for selecting said candidate character and said predetermined editing process in response to an operation on each said input frame, selection/editing means for selecting one of said candidate characters or performing said selected editing process on said candidate character in response to an operation on each of said displayed selection frame, candidate character display means for displaying either one of said candidate characters correlated with the handwritten character or said candidate character which is selected or edit processed, and character data accepting means for accepting as character data one of said candidate characters correlated with the handwritten character or said candidate character which is selected or edit processed.

The data input apparatus of this invention which is used for example for data input to a PDA apparatus recognizes a character handwritten by using a stylus pen, etc., in alignment with an input frame displayed to the user through a transparent tablet pasted on the screen of the display device, displays the recognized character and corrects a character erroneously inputted or recognized.

In the data input apparatus of this invention, the input frame display means displays one or more of input frames including a frame indicating the position in which a user is to write a handwritten character and buttons which is used for the user to instruct execution of changing the selection of candidate character obtained as a result of recognition in the screen of the display device.

The handwritten character receiving means receive, for example, a handwritten character written within each frame of the input frame displayed in the display device and display the received handwritten character within the frame of the input frame.

The character recognition means recognize which character the received handwritten character represents and correlate it with one or more characters (candidate characters) which possibly matches the handwritten character. One of candidate characters which the character recognition means correlated to the handwritten character, for example, the character of the highest possibility of matching the handwritten character (the prime candidate character) is displayed separately in a predetermined window (frame) in the display device as described later.

When a user points said button of the input frame with a stylus pen, etc., the selection frame displays means display a selection frame which simultaneously displays within a same window (frame) a list of candidate characters of a handwritten character inputted to an input frame and a menu of edit processing including deletion of the handwritten character (the prime candidate character) and insertion of a character to the preceding position (or the following position), etc in correspondence to the input frame including a pointed button.

Selection/edition means selects the pointed candidate character when the user points one of candidate characters displayed in the selection frame and replaces it with a current prime candidate character. The selection/edition means further performs an edit processing including deleting of the selected handwritten character (the prime candidate character) by selecting one of the choices of the menu.

The candidate character display means display the character of the highest possibility of matching (the prime candidate character) or a prime candidate character replaced or edited by the selection-edition means among the candidate characters recognized by the character recognition means in the predetermined window (frame) and further display it in the input frame in place of the handwritten character.

The character data accepting means accept the character obtained as a result of character recognition, selection or edition and displayed by the candidate character display means as character data.

DETAILED DESCRIPTION

Configuration of PDA Apparatus 1

Figure 1:
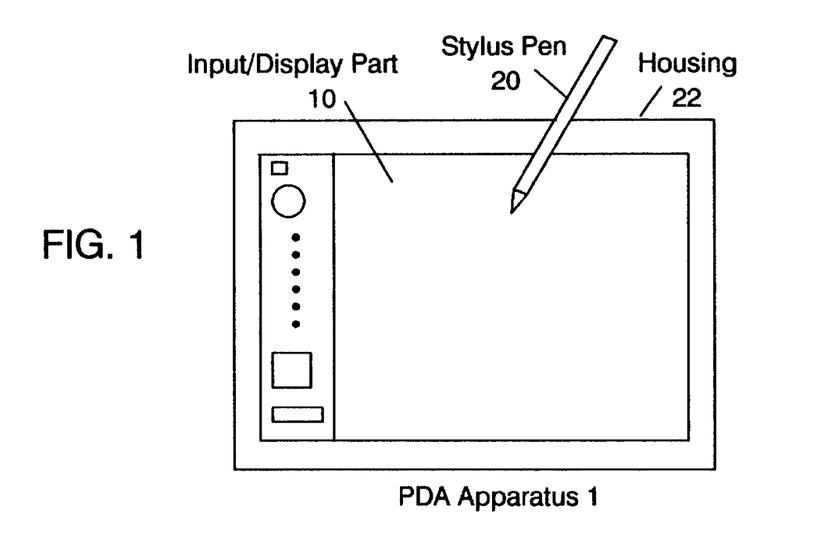
FIG. 1 is a representation appearance applicable to a PDA apparatus of this invention.

FIG. 1 shows the appearance of the PDA apparatus 1 of this invention. It is to be noted that those portions not necessary for the explanation of this invention are omitted in FIG. 1.

As shown in FIG. 1, the PDA apparatus 1 is in general a portable computer which is also called a pen computer and is provided with an input/display part 10 disposed in the upper face of a small sized and handy housing 22.

Figure 2:
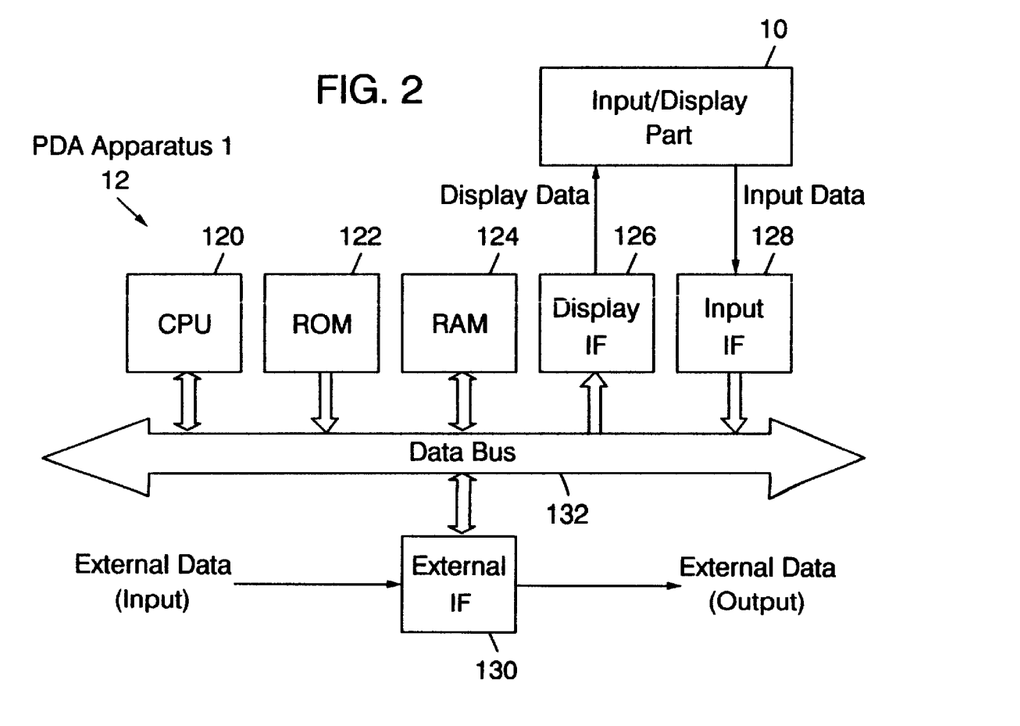
FIG. 2 is a representative configuration applicable to a PDA apparatus of this invention.

FIG. 2 shows the configuration of the PDA apparatus 1 as shown in FIG. 1.

As shown in FIG. 2, the PDA apparatus 1 comprises an input/display part 10 (FIG. 1) and a data processing part 12, for example.

The data processing part 12 comprises a microprocessor 120, a ROM 122, a RAM 124, a display interface circuit (display IF) 126, an input interface circuit (input IF) 128 and an external interface circuit (external IF) 130 connected via a data bus 132.

Figure 3:
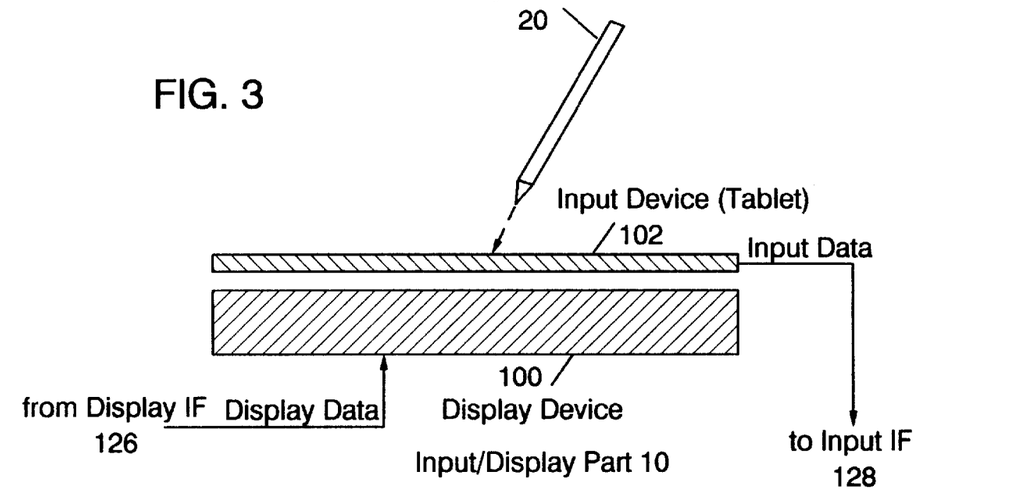
FIG. 3 shows a configuration of an input/display part for the PDA shown in FIG. 1 and FIG. 2.

FIG. 3 shows the configuration of the input/display part 10 as shown in FIG. 1 and FIG. 2.

As shown in FIG. 3, the input/display part 10 comprises a display device 100 such as an LCD display device (liquid crystal display device) or a plasma display device and an input device 102, which is pasted to the display face of the display device 100 and transmits therethrough the display of the display device 100 to the user, such as a thin and transparent tablet for input. Incidentally, the data processing part 12 may be additionally provided with other components such as a hard disk device, a floppy disk device or a CD-ROM, etc. for reproducing a recording medium in which a software is recorded in installing a software such as an input program 14 (to be described later with reference to FIG. 4) to the PDA apparatus 1.

With these components, the PDA apparatus 1 displays an operating screen for the user in the input/display part 10 and, when the user points to a predetermined position or range in the screen or handwrites a character with a stylus pen 20, performs a process corresponding to such manipulation.

Components of the PDA Apparatus 1

Each component of the PDA apparatus 1 shown in FIG. 1 to FIG. 3 is now described hereunder.

In the data processing part 12 (FIG. 2), the microprocessor 120 comprising a general purpose microprocessor and peripheral circuits thereof, for example, executes by using a character data input program 14 (to be described later with reference to FIG. 4), displays various operating graphic images in the display device 100 and recognizes and edits a handwritten character inputted to the input device 102 for generating character data.

The microprocessor 120 also executes an application program (not shown) stored in the ROM 122 for performing a process using character data accepted by the input program 14.

The display IF 126 outputs display data indicating operating graphic images which is generated by the microprocessor 120 to the display device 100 of the input/display part 10.

The input IF 128 outputs input data inputted from the input device 102 of the input/display part 10 to the microprocessor 120.

The external IF 130 outputs external data inputted from an external device (not shown) connected to the PDA apparatus 1 to the microprocessor 120 or external data inputted from the microprocessor 120 to the external device.

In the input/display part 10 (FIG. 3), the display device 100 displays display data including operating graphic images which are inputted from the microprocessor 120 via the display IF 126 for presentation to the user.

The input device 102 sequentially detects coordinates of positions to which the user pointed by using the stylus pen 20, etc., to generate input data indicating the detected coordinates and outputs them to the microprocessor 120 via the input IF 128.

Configuration of the Input Program, etc.

The configuration and each component of the input program 14 stored in the ROM 122 will now be described hereunder with reference to FIGS. 4 to 6.

Figure 4:
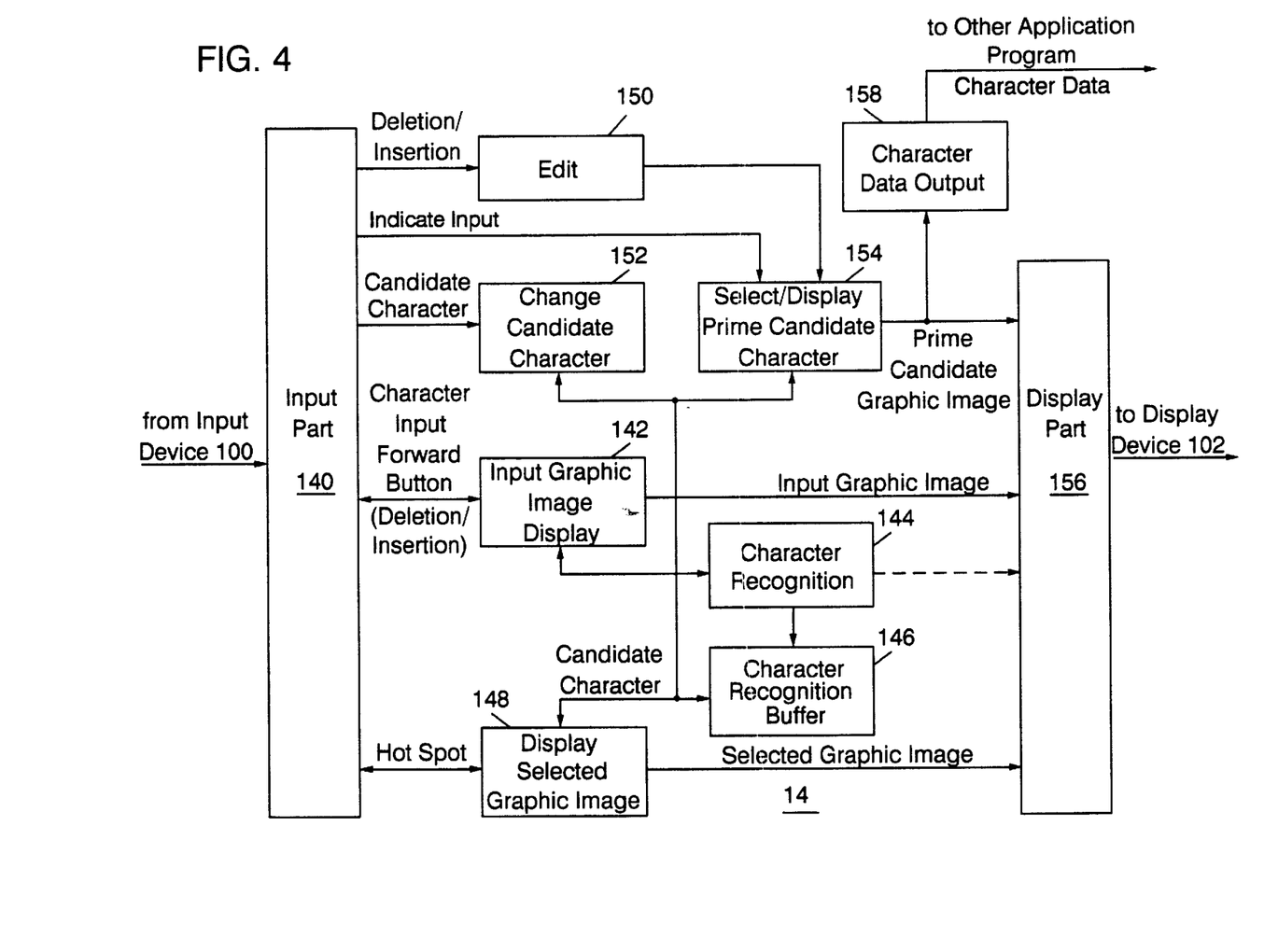
FIG. 4 shows a configuration of an input program stored in a ROM shown in FIG. 2.

FIG. 4 shows the configuration of the input program 14 stored in the ROM 122 shown in FIG. 2.

Figure 5:
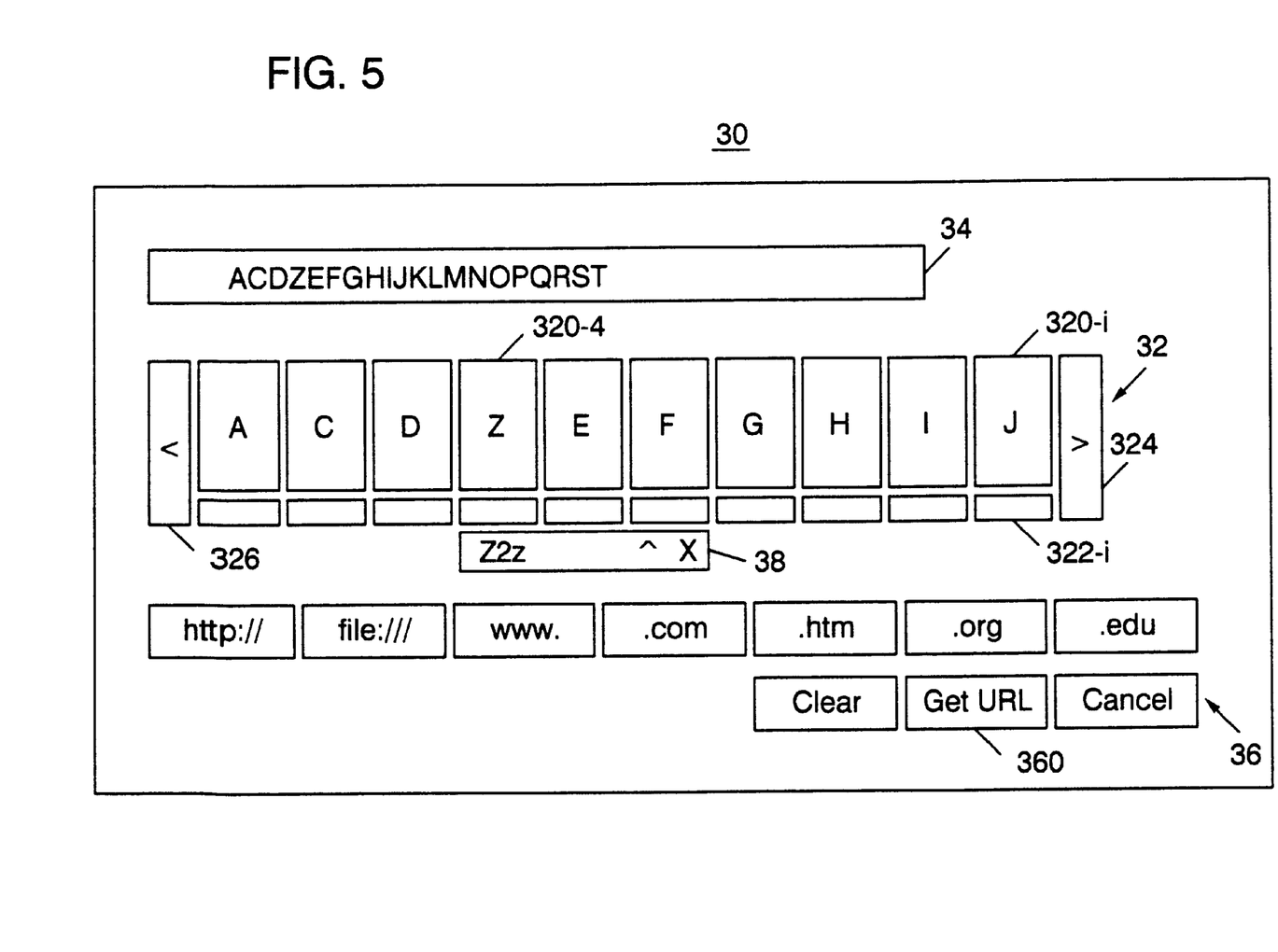
FIG. 5 shows an operating graphic image which the input program shown in FIG. 4 displays in a display device of the PDA shown in FIG. 1 to FIG. 3.

FIG. 5 illustrates a operating graphic image 30 which the input program 14 as shown in FIG. 4 displays in the display device 102 of the input/display part 10 as shown in FIG. 1 to FIG. 3. Incidentally, FIG. 5 shows an operating graphic image 30 where the application program is a browser for internet and the input program 14 is used for indicating an URL (uniform resource locator).

As shown in FIG. 4, the input program 14 comprises an input part 140, an input image display part 142, a character recognition part 144, a candidate character buffer part 146, a selection frame display part 148, an editing part 150, a candidate character changing part 152, a prime candidate character selection-display part 154, a display part 156 and a character data output part 158.

The input program 14 is externally supplied to the PDA apparatus 1 from a communication channel or a recording medium which records the input program 14 stored in the ROM 122. With these components, the input program 14 recognizes a handwritten character inputted by the user, correlates it to one or more characters which are possibly same as the handwritten character (candidate character), further changes selection of a candidate character, and performs an edit processing such as insertion and deletion in accordance with the operating graphic image 30 (FIG. 5) displayed in the display device 100 of the input/display part 10 to generate a character string (character data) desired by the user for output to another application program.

Input Part 140

In the input program 14, the input part 140 compares the coordinate indicated by the input data which is inputted from the input device 102 of the input/display part 10 with the coordinate of the input graphic image 32 (FIG. 5) displayed in the input image display part 142 a graphic image or character included in the selection frame 38 (FIG. 5) is displayed by the selection frame display part 148 to identify a handwritten character inputted by the user (character input), designation of display range of the handwritten character (forward button). The input part is responsive to the designation of selection process (hot spot), pointing a candidate character within the selection frame (candidate character), selection of edition menu such as deletion and insertion within the selection frame (deletion/insertion) and indication of accepting the character data (input indication).

The input part 140 further outputs determined input data (character input, forward button, hot spot, candidate character, deletion/insertion and input indication) to the input image display part 140, the selection frame display part 148, the candidate character changing part 152, the editing part 150 and the prime candidate selection/display part 154 depending on the result of the determination of the input data.

Input Graphic Image Display Part 142

The input graphic image display part 142, upon starting the input program 14, outputs data representing an input graphic image 32 of initial condition and operating button images 36 to the display part 156 an others graphic images included in the operating graphic images 30 shown in FIG. 5.

The input graphic image displayed by the input graphic image display part 142 includes, for example, an input frame 320-i (in FIG. 5, n=1 to 10) indicating the position which can receive a handwritten character to the user, a hot spot 322-i each corresponding to each input frame 320-i, a forward button 324 and a backward button 326.

The operating button image 36 includes an input indicating button 360 (Get URL) used for starting, for example, an application program. program, as well as buttons to input a character string (character data) used for inputting a URL address (http//, file:, www., com., .htm, org. edu), a button (clear) to invalidate character data so for inputted and a cancel button (cancel) indicating the end of inputting the character data.

The input graphic image display part 142 also displays a character input inputted from the input part 140 sequentially in the input frame 320-i in which the user writes the character. In other words, the input graphic image display part 142 displays a handwritten character in the input frame 320-i by tracing the user's stroke.

When the input graphic image display part 142 receives more than 11 handwritten characters, it changes the range of display of the input frames 320-i and the hot sports 322-i, It, displays character by character or scrolls all characters and, when input data indicating the the selection of the forward button 324 or the backward button 326 is received from the input part 140, it changes the display of the input frames and spots 320-i the hot 322-i forward or backward, respectively.

When the user completes input of one handwritten character to an input frame 320-i and starts to input another handwritten character to another input frame 320-j, or when a predetermined length of time has elapsed after input of a handwritten character to an input frame 320-i has occured, the input graphic image display part 142 outputs the handwritten character inputted to the input frame 320-i to the character recognition part 144.

When input data indicating an edit processing including deletion and insertion of a character from the input part 140 is inputted, the input graphic image display part 142 deletes or inserts into the input frame 320-i and the hot spot 322-i depending on the content of the processing to change the content of the input image 32. Incidentally, the input graphic image display part 142 may change the content of the input image 32 based on the indication by the editing part 150 and the candidate character changing part 152.

The input graphic image display part 142 displays the prime candidate character selected/edited by the prime candidate character select/display part 154 in the corresponding input frame 320-i in place of the handwritten character according to the control by the prime candidate character select/display part 154 (for simplicity of the drawing, control lines are omitted in FIG. 4).

Character Recognition Part 144

The character recognition part 144 extracts feature points of a handwritten character inputted from the input graphic image part 142, and recognizes the handwritten character by comparing the extracted feature points of the handwritten character with the feature points extracted in advance for each character. In other words, the character recognition part 144 correlates one or more characters having many feature points common to the inputted handwritten character to the handwritten character as a candidate character and outputs the result of correlation to the candidate character buffer part 146.

Candidate Character Buffer Part 146

The candidate character buffer part 146 stores a candidate character inputted from the character recognition part 144 and outputs it to the selection frame display part 148, the candidate character changing part 152 and the prime candidate selection display part 154.

Selection Frame Display Part 148

When input data indicating that the user points to the hot spot 322-i is inputted from the input part 140, the selection frame display part 148 outputs data (selection frame) which displays a selection frame 38 in correlation to the input frame 320-i (hot spot 322-i) to the display part 156, the selection frame 38 including within the same frame (window) a list of candidate characters inputted from the candidate character buffer 146, the handwritten character inputted to the input frame 320-i corresponding to the hot spot 322-i, and symbols indicating possible editing process steps including deletion and insertion of the prime candidate character displayed in the prime candidate display image 34 (in the example shown in FIG. 5, deletion is indicated by "x" while insertion is indicated by "^").

Editing Part 150

When input data indicating that the user points to a symbol of editing process including deletion/insertion of the selection frame 38 is inputted from the input part 140, the editing part 150 correlates, for example, the content of the editing process indicated by the user to the input frame 320-i (hot spot 322-i) corresponding to the selection frame 38 for output to the prime candidate selection display part 152.

Candidate Character Changing Part 152

When input data indicating that the user points to one of the candidate characters displayed in the selection frame 38 is inputted from the input part 140, the candidate character changing part 152 correlates, for example, the candidate character pointed by the user to the input frame 320-i (hot spot 322-i) corresponding to the selection frame 38 for output to the prime candidate character selection/display part 154.

Prime Candidate Character Selection/Display Part 154

The prime candidate character selection/display part 154 generates a prime candidate frame 34 as shown in FIG. 5 and outputs it to the display part 156. In the prime candidate frame 34, a candidate character of the highest probability of matching the handwritten character (the prime candidate character) appears along with one or more other candidate characters inputted from, the candidate character buffer part 146 the candidate characters are selected and disposed in the sequence they correlate with the handwritten characters in the input frame 320-i (hot spot 322-i), and are displayed with character strings (http://, file://, www., etc.) to be selected by pointing by the button of the input image 32.

The prime candidate character selection/display part 154 performs edit processing inputted from the editing part 150 which is correlated to the input frame 320-i (hot spot 322-i), including, for example, deletion of the prime candidate character corresponding to the input frame 320-i and insertion of a character replacing (or the prime candidate character to be edited to change the content displayed in the prime candidate frame 34.

The prime candidate character selection/display part 154 replaces the candidate character inputted from the editing part 150 which is correlated to the input frame 320-i (hot spot 322-i) with the current prime candidate character for displaying it as a new prime candidate character thereby changing the content displayed in the prime candidate frame 34.

When input data indicating pointing of the input indicating button 360 is inputted from the input part 140, the prime candidate character selection/display part 154 outputs the character data which is deemed to be the prime candidate character according to the operation so far posed to the input program 14 to the character data output part 158 with character data indicating a character string selected by a button within the operating button images 36.

The prime candidate character selection/display part 154 also controls the input graphic image display part 142 to cause the prime candidate character selected and edited in the above described manner to be displayed in the corresponding input frame 320-i in place of the handwritten character.

Display Part 156

The display part 156 displays the input graphic image 32 inputted from the input graphic image display part 142, the selection frame 38 inputted from the selection frame display part 148, and the prime candidate frame 34 inputted from the prime candidate selection/display part 154 in the display device 100 of the input/display part 10.

Character Data Output Part 158

The character data output part 158 performs a conversion process to cause the input data inputted from the prime candidate character selection/display means 154 to be adapted to, for example, another application program for output thereto.

Operation of PDA Apparatus The operation of the PDA apparatus 1 will be described hereunder with reference to FIG. 6 and FIG. 7.

Figure 6:
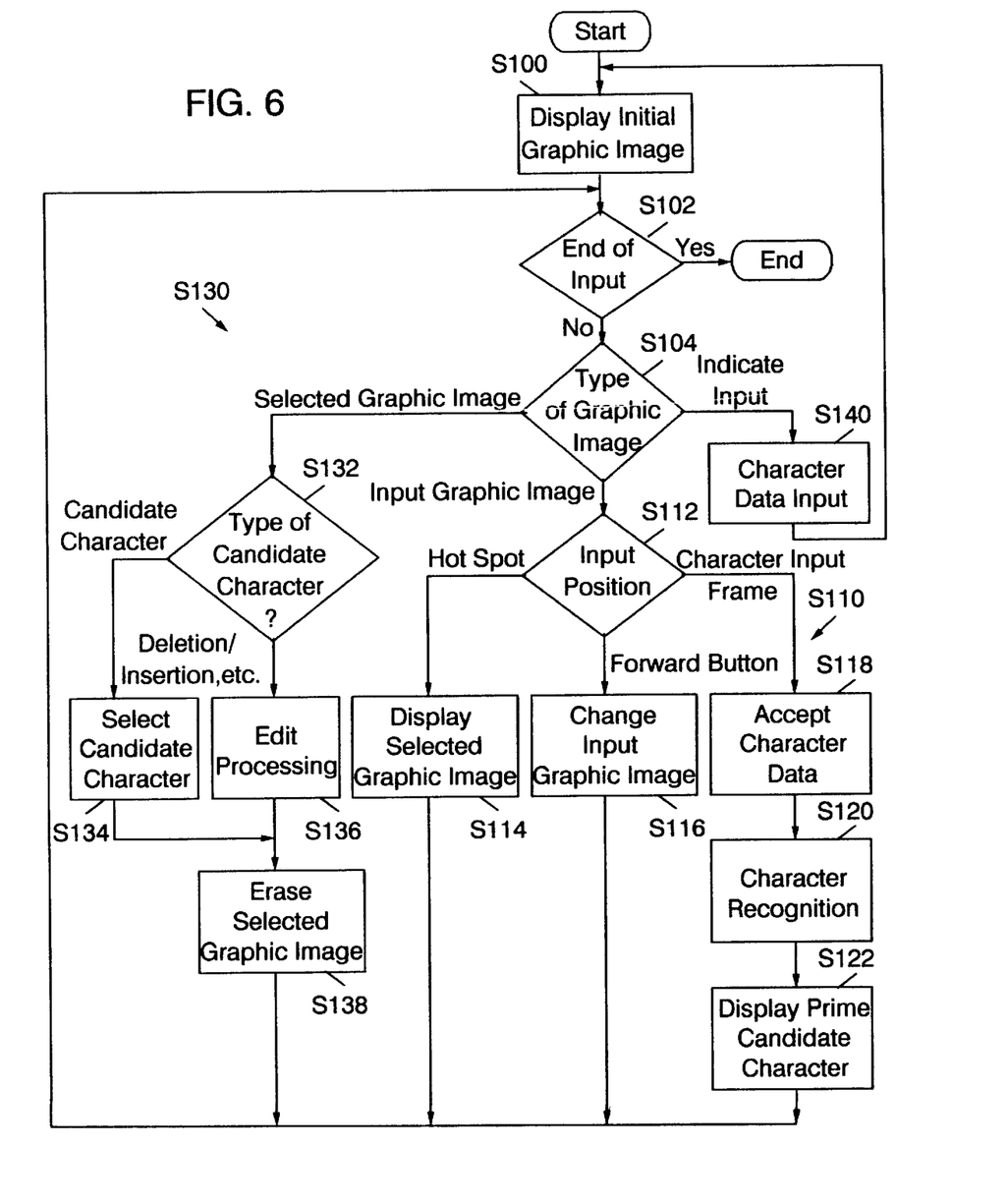
FIG. 6 is a flow chart of the operation of the PDA apparatus of FIGS. 1 to 3.

FIG. 6 is a flow chart showing the operation of the PDA apparatus 1 (FIG. 1, etc.) in which processing of the input program 14 (FIG. 4) is focused.

Figure 7A:
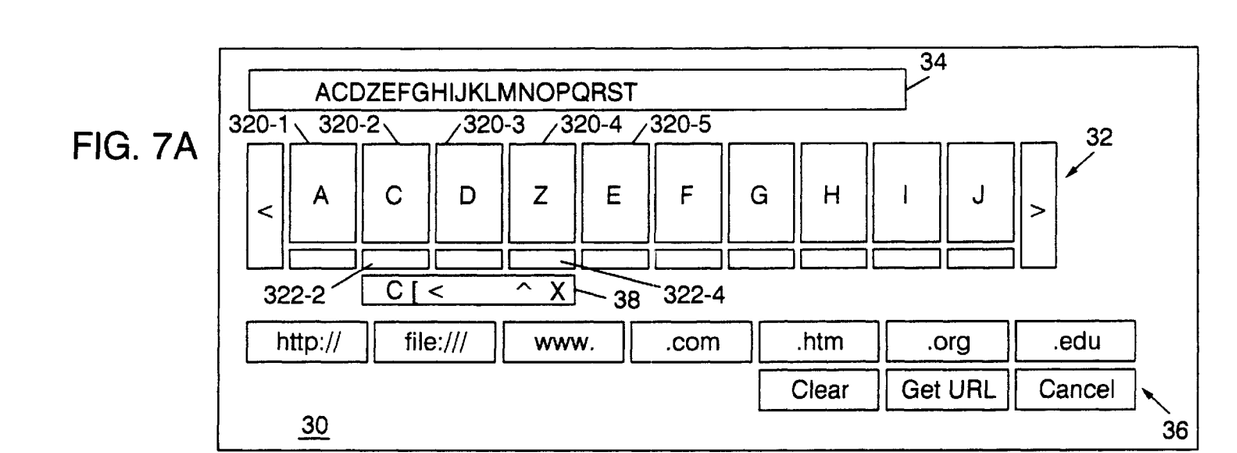
FIGS. 7(A) and (B) show a prime candidate character and operating graphic images for cases where a character is deleted or a new character is inserted (editing process) with respect to the handwritten character displayed in an input graphic image.
Figure 7B:
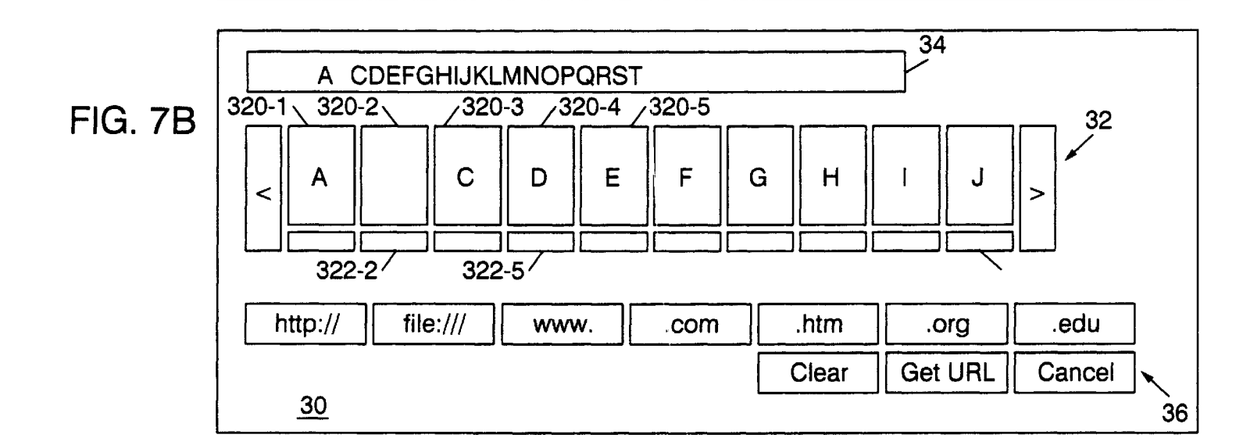

FIG. 7 (A), (B) show the operating image 30 for a case where a character is deleted from or inserted to the prime candidate character (handwritten character) displayed in the input graphic image 32.

As shown in FIG. 6, in step 100 (S100), when the input program 14 is started in response to activation of a switch (not shown) disposed in the input/display part 10 or the housing 22 of the PDA apparatus 1, the input graphic image display part 142 displays the initial screen of the operating graphic image 30 [for example, the operating graphic image 30 which is in a state where the selection frame 38 is not displayed and no character is displayed in either the input image 32 and the prime candidate frame 34] in the display device 102 via the display part 156.

In step 102 (S102), the input part 140 determines whether or not the input data inputted from the input device 100 has terminated, for example, by use of the cancel button (Cancel) of the selection frame 38. When the input data indicates the end of input of the character data, the input part 140 ends the operation of the input program 14 while it proceeds to the process of S104 when the input data does not indicate the end of input of the character.

In step 104 (S104), the input part 140 determines whether or not the input data indicates that any of the input graphic image 32 displayed in the display device 102, the selection frame 38 and the input indicating button 360 of the operating button image 36 is pointed to. The input part 140 proceeds to the input graphic image processing (S110) when it determines that the input graphic image 32 is pointed to, to the selection frame processing (S130) when it is determined that the selection frame 38 is pointed to, and to S140 when it determines that the input indicating button 360 of the operating button image 36 is pointed to.

In step 112 (S112) of the input graphic image processing (S110), the input part 140 determines the position pointed to within the input graphic image 32. When the input part 140 determines that the hot spot 322-i of the input graphic image 32 is pointed to, it notifies the selection frame display part 148 of that effect and proceeds to the process of S114 and, when it is determined that either the backward button 326 or the input frame 320-i is pointed to, it notifies the input graphic image display part 142 of that effect and proceeds to the process of S116 or S118.

In step 114 (S114), the selection frame display part 148 displays the selection frame 38 in the display device 102 via the display part 156 with the selection frame 38 correlated to the pointed to hot spot 322-i as shown in FIG. 5.

In step 116 (S116), when the input program 142 is so set in advance as to scroll character by character and prime candidate characters (handwritten characters) [ZEFGHIJKLM] are displayed in the input graphic image 32 of the operating graphic image 30 shows in FIG. 5, the input graphic image display part 142 changes the display of each prime candidate character (handwritten character) in the input frame 320-1, . . . 320-10 of the input graphic image 32 by sequentially shifting the display forward character by character in the sequence of [EFGHIJKLMN], [FGHIJKLMNO], . . . every time the forward button 324 is pointed to and sequentially shifting the display backward character by character in the sequence of [DZEFGHIJKL], [CDZEFGHIJK], . . . every time the backward button 326 is pointed to.

Incidentally, it is preferable to make the display of only the portion of [ZEFGHIJKLM] inverted among the character string within the prime candidate frame 34 so as to make it easy to recognize which portion of the character string within the prime candidate frame 34 is displayed in the input graphic image 32 when the prime candidate characters (handwritten characters) [ZEFGHIJKLM] are displayed in the input graphic image 32.

When the input program 14 is so set in advance as to scroll all characters, by pointing to the forward button 324, in S116 causes the input graphic image display part 142 to change the display of characters in the input frames 320-1 . . . 320-10 of the input graphic image 32 to [NOPQR5T____] ("_" represents a space) and the portion of [NOPQR5T] of the character string of the prime candidate frame 34 to be inverted in the display. Conversely, if the backward button 326 is pointed to, the input graphic image display part 142 changes the display of the prime candidate characters (handwritten characters) in the input frames 320-1, . . . 320-10 to [_ _ _ _ _ _ _ACD] with the portion of [ABC] of the character string of the prime candidate frame 34 to be inverted in the display.

In step 118 (S511), the input graphic image display part 142 receives the handwritten character written by the user in the input frame 320-i and outputs it to the character recognition part 144.

In step 120 (S120), the character recognition part 144 recognizes an inputted character to correlate it to a candidate character and outputs the correlated character to the candidate character buffer 146.

In step 122 (S122), the prime candidate character selection/display part 154 selects either one of candidate characters (the prime candidate character) buffered in the candidate character buffer part 146 and displays it in the prime candidate frame 34 in correlation to the input frame 320-i as shown in FIG. 5.

In step 132 (S132) of the selection process (s130), the input: part 140 determines which of the candidate characters within the selection frame 38 [for example, (Z2z) shown in FIG. 5 or (C[<c) shown in FIG. 7 (A)] and symbols of edit processing [for example,, (^x) shown in FIG. 5, FIG. 7 (A)] was pointed to. When it is determined that the candidate character of the selection frame 38 is pointed to the input part 140 notifies the candidate character changing part 152 of that effect and proceeds to the process of S114 while, when it is determined that either one of the forward button 324, the backward button 326 and the input frame 320-i is pointed to, it notifies the editing part 150 and the input graphic image display part 142 of that effect and proceeds to the process of S136 or S138.

In step 136, when a candidate character (2) is pointed in the selection frame 38 displayed in correspondence to the input frame 320-4 as shown in FIG. 5, the candidate character changing part 152 correlates the candidate character (2) to the input frame 320-4 for output to the prime candidate character selection/display part 154.

In step 136 (S136), when a symbol (x) indicating deletion is selected in the selection frame 38 which is displayed in correspondence to the input frame 320-2 and a symbol (^) indicating insertion is selected in the selection frame 38 which is displayed in correspondence to the input frame 320-4 in the operating graphic image 30 as shown in FIG. 7 (A), the editing part 150 correlates each of the input frames 320-2, 320-4 to the type of edit processing (deletion, insertion) for output to the prime candidate character selection/display part 154.

In step 138 (S138), the prime candidate character selection/display part 154 deletes the character (z) in the prime candidate frame 34 and inserts a space preceding to the character (C) to change the display of the prime candidate frame 34 from the character string [ACDZEFGHIJKLMNOPQR] shown in FIG. 7 (A) to Et character string [A_CDEFGHIJKLMNOPQR] shown in FIG. 7 (B) for display in the display device 102 via the display part 156.

The input graphic image display part 142 also deletes the current input frame 320-4 and the hot spot 322-4, inserts a new input frame 320-2 in which no handwritten character has been inputted and changes the current input frames 320-2, . . . 320-9 to new input frames 320-3, . . . 320-10, to change the display of the input frames 320-1, . . . 320-10 from a character string [ACDEFGHIJ] of the prime candidate characters (handwritten characters) shown in FIG. 7 (A) to the character string [A_CDEFGHIJ] shown in FIG. 7 (B) for display in the display device 102 via the display part 156.

In step 140 (S140), the prime candidate character selection/display part 154 outputs the character string of the prime candidate characters so far selected and edited to another application program as character data via the character data output part 158 and further controls the input graphic image display part 142 to cause the prime candidate character to be displayed in the input frame 320-i in place of the handwritten character.

The microprocessor of the data processing part 12 executes an application program which processes character data inputted by the operation of each step described in the above.

As described in the above, according to the input program 14 used in the PDA apparatus 1, a handwritten character is easily inputted and a character recognized or inputted in error is changed easily. An advantage of improved operability of the input program 14 is now described in detail.

Figure 8:
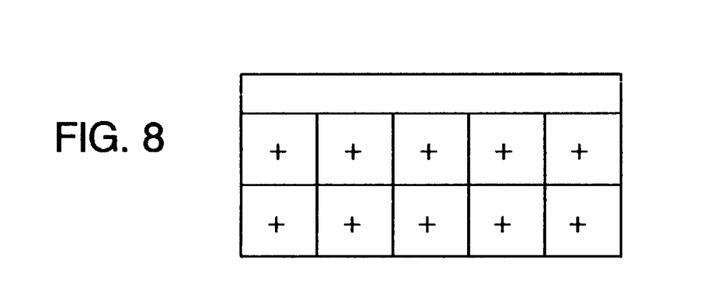
FIG. 8 shows a first conventional handwritten character input method which is compared to the handwritten character input method of this invention.

When a symbol (+) displayed in the center of the input frame is pointed to in correcting a character which is inputted by an error as a method of inputting a handwritten character as shown in FIG. 8, for example, pointing to the symbol (+) is apt to be erroneously recognized as addition of a new point [('), etc.] to the handwritten character. However, such further recognition error doe; not occur with the input program 14.

Figure 9:
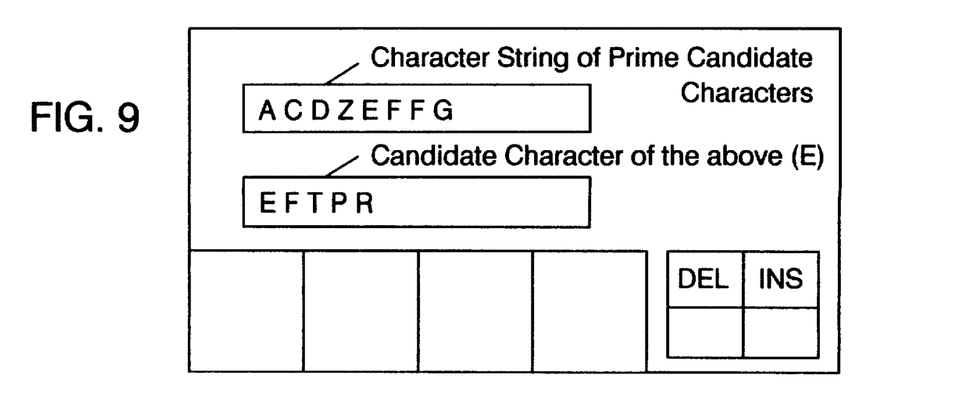
FIG. 9 shows a second conventional handwritten character input method which is compared to the handwritten character input method of this invention.

Alternatively, it is possible to employ a handwritten character input method by pointing one of characters ("E", for example) in the character string of the prime candidate characters, displaying corresponding candidate characters ("EFTPR", for example) below and further displaying a menu of edit processing (DEL, INS) in another portion.

While it is necessary according to the method shown in FIG. 9 to point different ranges in selecting a menu of edit processing and in selecting a candidate character, the candidate character and the edit processing can be selected in the same frame with the input program 14 thereby improving the operability with a reduced fatigue of user's eyes and hands.

While it is necessary in correcting an erroneously recognized character for the user to take 3 steps of selecting the character to be corrected, selecting a correcting method to be used (either one of changing the character and edit processing of deletion, insertion, etc.) and further selecting a particular candidate character or a particular edit processing, a character can be corrected only with 2 steps of selecting the character to be corrected and then selecting a particular candidate character or a particular edit processing according to the input program 14. Accordingly, the efficiency of inputting a handwritten character is greatly improved with the input program 14.

Further, various alterations and modifications may be applied to the above described embodiment of this invention as shown hereunder.

For example, the input program 14 may be applicable to not only the PDA apparatus 1 but also a desk top computer with a tablet.

The configuration of the input program 14 shown in FIG. 4 is shown for exemplary purpose and a modifications are possible such as configuring the editing part 150 and the candidate character changing part 152 to be included in the prime candidate character selection/display part 154.

Further, the input program 14 may be applicable to various software functions including ordering and receiving an order by an electronic mail, a schedule control using a handwritten character, a word processor and a spread sheet beside an application to the browser of internet.

Further, the input program 14 may be so configured as to be capable of displaying in the selection frame 38 symbols indicating some other edit processing such as movement of a character in addition to deletion and insertion and performing edit processing other than deletion and insertion of a character string.

Also, the operating graphic image 30 shown in FIG. 5 is for an exemplary purpose and the display content may be arbitrarily changed depending on the use. The number of frames (windows) such as the input frames 320-i displayed simultaneously in the operating graphic image is one or more and an arbitrary number.

Also, when the user selects insertion to characters under edition, the operation of the input program 14 may be modified so as to insert a new input frame or a space following the character under the edition.

Therefore it should be understood that various modifications can be made in what has been set forth without departing from the spirit and scope of the invention.

I claim:

1. A data input apparatus comprising;
    input frame display means for displaying a plurality of separate written character input frames each input frame for use for the input by a user of a single handwritten character,
    handwritten character receiving means for receiving a single handwritten character inputted to each of said displayed input frames to display each handwritten character in the input frame a in which it was inputted,
    character recognition means for recognizing each received handwritten character to correlate it with a known character for display of that known character into the same input frame in which the handwritten character was entered,
    selection frame display means for displaying a selection frame containing, in a single window, candidates of known characters for a handwritten character in any one of the plurality of input frames selected by the user and graphic images indicating predetermined editing processes for said candidates of known characters, said selection frame display means being used for selecting one of said candidate characters and one or more of said predetermined editing processes,
    a different selection/editing means for each input frame for selecting for that input frame with the selection display means for selection of one of said candidates of known characters or for performing a selected editing process in the selection frame means,
    candidate character display means for displaying either a known character correlated with the handwritten character or a known character which is selected or edit processed, and
    character data accepting means for accepting as character data a known character correlated with the handwritten character or a known character which is selected or edit processed.

2. A data input apparatus of claim 1 in which;
    said selection frame display means displays a graphic image in said selection frame for selection of a character insertion process,
    said input frame display means displays a new input frame at a position preceding to or following said input frame corresponding to the displayed selection frame when said character insertion process is selected, and
    said handwritten character receiving means receives a handwritten character inputted to said new input frame.

3. A data input apparatus of claim 1 in which;
    said selection frame display means displays a graphic image in said selection frame for selection of a character deletion process,
    said input frame display means deletes the display of said input frame corresponding to said selection frame operated on when said character deletion process is selected, and
    said handwritten character receiving means deletes a known character corresponding to said selection frame operated on from said received character data when said character deletion process is selected.

4. A data input apparatus of claim 1 in which;
    said candidate character display means displays in an input frame either one of said candidate characters correlated to the handwritten character in that input frame or a character selected or edit processed in place of the handwritten character.

5. A data input apparatus of claim 1 further comprising;
    range indicating graphic image display means for displaying a range indicating graphic image used for indicating the range of said input frame to be displayed, in which;
    said input frame display means displays said input frame in the indicated range among a plurality of said input frames in response to the operation on said range indicating graphic image.

6. A data input method comprising the steps of;
    displaying a plurality of separate written character input frames used for input by a user of a single handwritten character to each one of input frames,
    receiving a separate handwritten character inputted by the user into each of said displayed input frames to display it in that input frame, correlating each received handwritten character to features of known characters for entry of that known character into the same single character input frame which received the corresponding handwritten character, displaying a selection frame containing a display of candidates of known characters for a handwritten character in any selected input frame and a graphic image indicating a predetermined editing process for the selected input frame which selection frame is used for selecting one of the known characters and for performing said predetermined editing process, selecting one of said input frames for displaying the selection frame for selection for that input frame of a candidate of known characters or performing said selected editing process on said candidate of known characters, displaying in the input frame either a known character correlated with the handwritten character or a known character which is selected or edit processed from the candidates of known characters, and accepting as character data the known character correlated with the handwritten character or said known character which is selected or edit processed.

7. A computing program product, on a computer readable medium, for identifying handwritten characters entered onto a screen of a computer product, the computer program product comprising:

frame software for displaying a plurality of input frames used for input by a user of a string of handwritten characters each handwritten character to be inputted in a different one of the input frames, receiving software for receiving a handwritten character inputted by the user to any one of said displayed input frames to display it in said input frame, recognition software for correlating characteristics of the received handwritten character with characteristics of known characters for generating a set of candidates of known characters, selection frame software for displaying separate from the input frames a selection frame containing candidates of known characters for any handwritten character entered into any one of the displayed input frames and graphic images indicating predetermined editing process which selection frame is used for selecting one of said candidates of known characters and said predetermined editing process, character selection software for selecting one of said selection frames for selection one of the characters in the set of candidates of known characters for the handwritten characters entered into that input frame or for performing said selected editing process on a known character in the selection frame, displaying software for displaying in the selected input frame either a known character correlated with the handwritten character or a known character which is selected or edit processed from the candidates of known characters, and accepting software for accepting as character data the known character correlated with the handwritten character or the known character which is selected or edit processed.

8. The computing program product of claim 7 including message software for a message area separate from the input frames and the selection frame for displaying a message generated using the input frames and the selection frames.

9. The computing program product of claim 8 including action software for displaying actions to be taken with respect to data displayed in the message frame.

10. The computing program product of claim 9 including stepping software for selecting any set of contiguous positions within the message frame and displaying them in the input frame for modification of the message using the input frames and the selection frame.

11. The computing program product of claim 10 where the actions to be taken using the action software includes sending messages on the internet.

12. A computer system comprising:

a computer screen responsive to handwritten entries;

frame software for displaying a plurality of input frames on the computer screen used for input by a user of a string of handwritten characters each handwritten character inputted in a different one of the input frames, receiving software for receiving a handwritten character inputted by the user to any one of said displayed input frames to display it in said input frame, recognition software for correlating characteristics of the received handwritten character with characteristics of known characters for generating a set of candidates of known characters, selection frame software for displaying separate from the input frames a selection frame containing candidates of known characters for any handwritten character entered into any one of the displayed input frames and graphic images indicating predetermined editing process which selection frame is used for selecting one of said candidates of known characters and said predetermined editing process, character selection software for selecting one of said selection frames for selection one of the characters in the set of candidates of known characters for the handwritten characters entered into that input frame or for performing said selected editing process on a known character in the selection frame, displaying software for displaying in the selected input frame either a known character correlated with the handwritten character or a known character which is selected or edit processed from the candidates of known characters, and accepting software for accepting as character data the known character correlated with the handwritten character or the known character which is selected or edit processed.

13. The computer system off claim 12 including message software for a message in an area separate from the input frames and the selection frame for displaying a message generated using the input frames and the selection frames.

14. The computer system of claim 13 including action software for displaying touch response action areas displaying actions to be taken with respect to data displayed in the message frame.

15. The computer system of claim 14 including stepping software for selecting any set of contiguous positions within the message frame and displaying them in the input frame for modification of the message using the input frames and the selection frame.

16. The computer system of claim 15 where the actions to be taken using the action software includes sending messages on the internet.

* * * * *